2 Sheets—Sheet 1.
H. OGBORN.
HOG-TRAP.
No. 186,945. Patented Feb. 6, 1877.
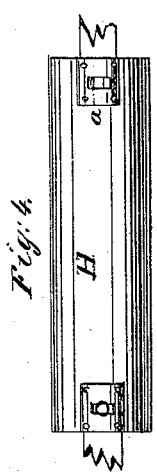
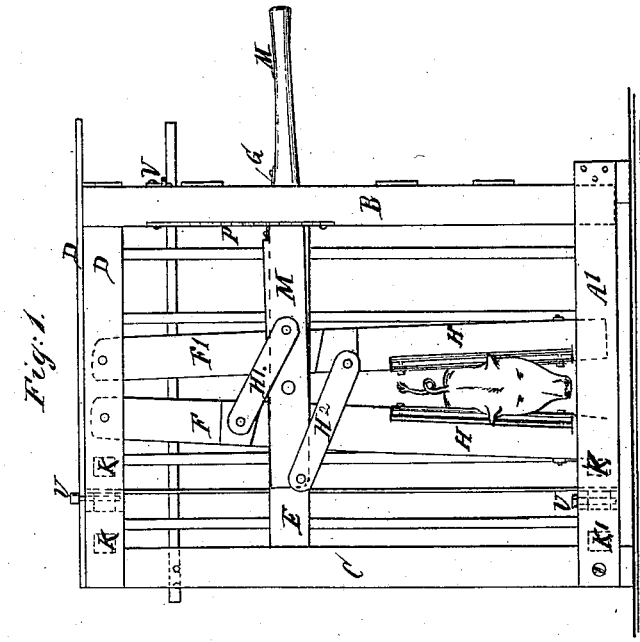
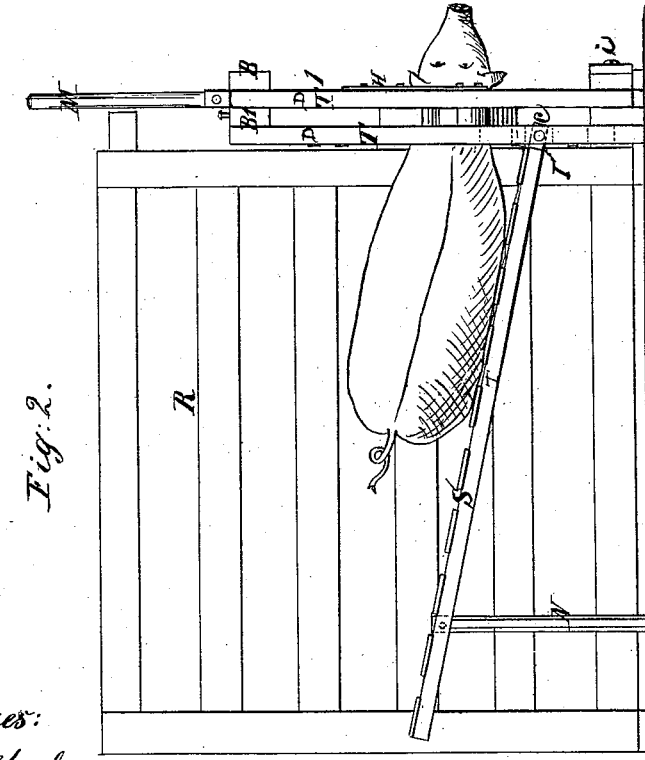
Witnesses:
Ernst Bilhuber
A. W. Kendrick
Inventor:
Harrison Ogborn

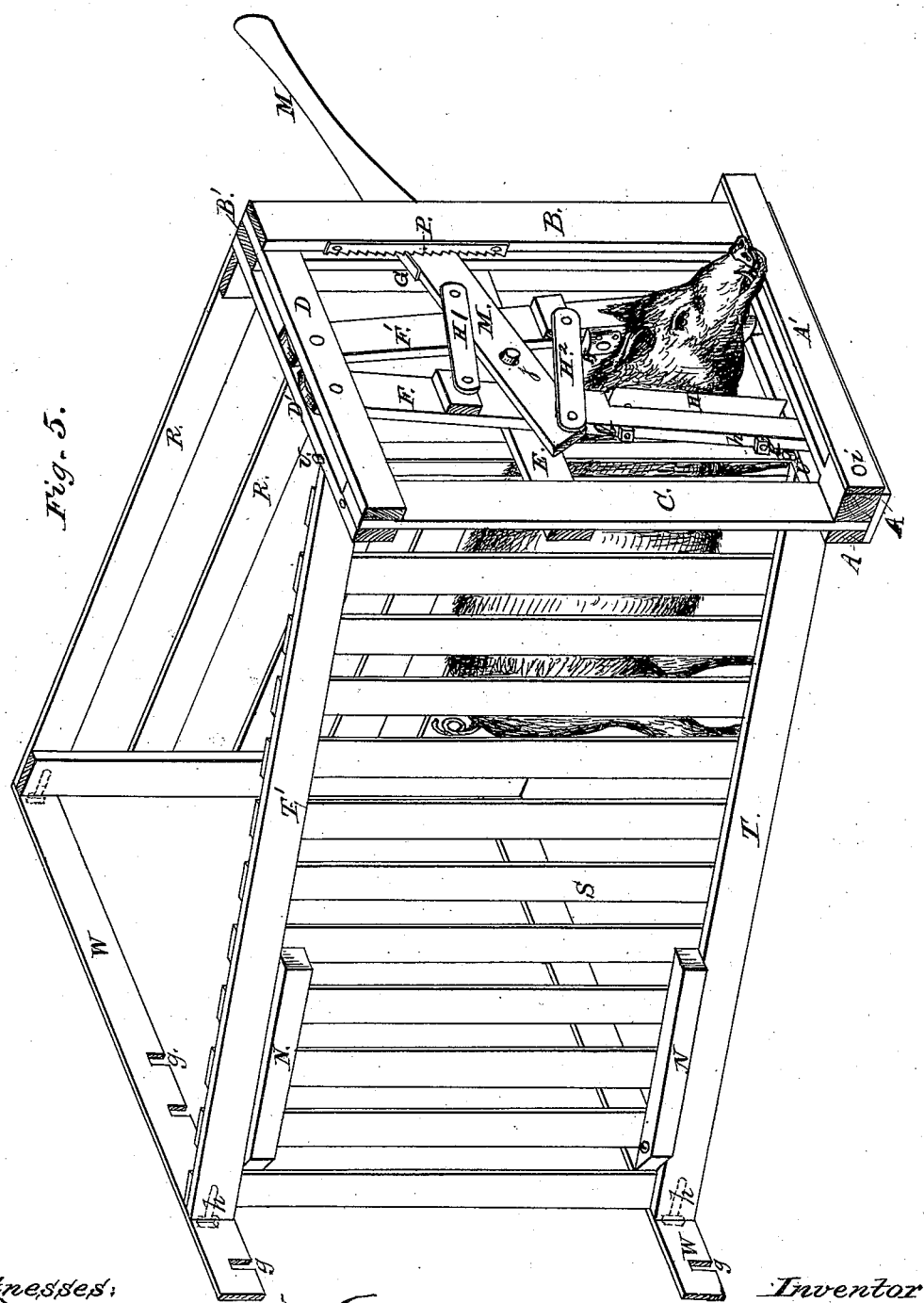

UNITED STATES PATENT OFFICE.

HARRISON OGBORN, OF RICHMOND, ASSIGNOR TO SAMUEL WATSON, OF DUBLIN, INDIANA.

IMPROVEMENT IN HOG-TRAPS.

Specification forming part of Letters Patent No. 186,945, dated February 6, 1877; application filed January 11, 1877.

*To all whom it may concern:*

Be it known that I, HARRISON OGBORN, of the city of Richmond and State of Indiana, have invented new and useful Improvements in Hog-Traps; and I hereby declare this to be a full, clear, and exact description of the same, reference being had to the accompanying drawings, making part of this specification.

The object of my invention is to construct a device that will securely hold hogs and other animals while being washed, ringed, marked, castrated, spayed, dressed, or subjected to medical treatment, or in removing tusks from old vicious hogs; and to prevent the hogs from being injured by being caught either by hand or by machines having hard rigid jaws; and to prevent the animals injuring the persons catching them.

Figure 1 is a vertical sectional view taken in front of the trap. Fig. 2 is a side elevation, with the head or front turned down on its side. Figs. 3 and 4 are views of detached portions thereof. Fig. 5 is a perspective view of our invention in use.

The frame should be stoutly made, and all parts firmly united by bolts or otherwise.

In the accompanying drawings, A A represent the ground-sills. At one end of these sills rise standards B B', at the other end standard C, which are all braced and held in position by cross-pieces D D' at the top, and cross-bar E, placed lower down on the front of the trap, to which the operating-lever M is attached. A' is a cross-piece, attaching the two sides of the frame, and to which the panel S, hereinafter described, is hinged. The jaws F F' are pivoted at the top of the trap to cross-bars D D', which are placed far enough apart to receive them between their sides. These jaws have adjustable upright bars H H attached to them by bolts $b$ $b$ passing through them. These bars are rounded on their inner sides, and have V-shaped horizontal mortises through them, near each end thereof, widest at the rounded side. These mortises should be lined at their widest end with metal plates, to prevent the head of the bolt cutting the wood. These bars are attached to the jaws F by bolts $b$ passing through them, loosely fitting in the mortises, and then driven into and through the jaws F tightly, and further held in position by nuts K on the ends of the bolts. These upright bars may be hinged in any other convenient or analogous manner to make them self-adjusting. An operating-lever, M, is pivoted at $j$, a short distance from its end, to a permanently-attached cross-bar, E. The other end extends beyond the outside of the frame of the trap, and serves as a handle to operate the working parts of the trap. Pivoted to this operating-lever M are two pressure-bars, $H^1$ $H^2$. These bars are also pivoted to the upright jaws F F', by bolts or otherwise, and cause the jaws to be opened or closed accordingly as the lever M is raised or lowered to any position, and with any degree of force and velocity required. Permanently attached to the upright post B is a ratchet, P. This ratchet engages with a catch, G, on the under side of the lever M, which acts as a stop to hold the lever down, and prevent the jaws opening when the animal has been caught. This lever may be pivoted to act from either side of the trap, but preferably from the side shown in the drawings.

In use, if the animal should be caught on its jaws or shoulders, the bars H H instantly adjust themselves to the uneven surface and relieve the strain, and also act over a larger surface, and prevent the animal's excessive struggling, or in any way injuring itself while being held in the trap. The panel R closes up the side of the trap next to the operator, and is detachably attached to the head of the trap, at the top thereof, by a hook, V, and an eye, or otherwise. The opposite side of the trap is closed by a panel, S. This panel should be made with two horizontal bars, T T', with upright boards attached to them, to form the sides of the trap. On one end of each of these bars are horizontal tenons I, which pass into either of a series of horizontal mortises, K K', in the sill A and cross-bar D. A pin or bolt, U, passes down through the cross-bar D, sill A, and tenons on bars of panel S, to hold the frame in an upright position. The width between the sides may thus be changed at will. This adjustable frame and panel also acts as a spaying-table. When it is to be used as a spaying-table for a small animal it should be placed with the tenons I on the bar D, and sill A in the inside mortises K, and the animal driven into the trap and caught by the neck. If a large animal, then the panel should be placed farther away, so that its sides and shoulders will be against the table when fastened in the trap. If the animal is to be spayed the head of the trap is detached from the side R, the supporting-legs N turned outward on side S, and the trap turned over on its side, which is pivoted to the cross-piece A' at $i$, its lower corner to the sills A A, and the animal will be on its side, with its head the lowest, ready to be tied, and spayed successfully.

When the operation is complete, the trap is again set up, and the animal released by raising the lever M.

In use for other purposes, the animal being driven into the trap, and when its head is through the trap, the lever M is suddenly lowered, and the jaws forced toward each other, so that the adjustable bars H H catch and hold the animal firmly, without in any way injuring it. The animal, upon being suddenly released by lifting the bar M, will pass on through the trap, and the lever being thus raised the trap will be ready for the next animal to be caught.

At the end of the trap farthest from the head are two cross-boards, W W, one at the top and the other at the bottom of the trap, for holding the sides of the trap firmly in position, and to vary its width at the back end. These boards are hinged at one end by bolts or screws, or in any convenient manner, and fastened at the other end by slots $g\ g$, cut some distance apart in their lower edges, near the free end, which slots drop onto and engage with bolts $h\ h$, fastened in the ends of the rails in panel S. These bolts have large heads on them, which prevent the boards becoming accidentally displaced while in use. These boards may be instantly attached or detached at one end, when desired.

This trap is very useful for holding hogs while washing, spaying, marking, castrating, ringing, dressing, subjected to medical treatment, or in removing tusks from old vicious hogs; is cheap and easily made, and strong and durable in construction. By moving both jaws simultaneously, it acts twice as quick as if only one jaw moved. The upright bars H H being adjustable are much less dangerous to the animal, and much safer, effective, and satisfactory to the operator, as many animals are dangerous and vicious when caught by hand.

Having thus described my invention, what I claim therein as new and useful, and desire to secure by Letters Patent, is—

1. The hinged adjustable upright bars H H, having V shaped mortises $a\ a$ cut in them near each end, in combination with the pivoted bars F F' and bolts $b\ b$, when used together for the purposes and in the manner substantially as set forth and described.

2. The upright adjustable bars H H and jaws F F', in combination with lever M and pivoted pressure-bars $H^1\ H^2$, when used and operated together for the purposes and in the manner substantially as set forth and described.

3. The panel S, hinged to the cross-piece A', in combination with the jaws F F' and lever M, substantially as and for the purposes set forth.

HARRISON OGBORN.

Witnesses:
 THEODORE MUNGEN,
 A. W. KENDRICK.